United States Patent [19]

Brockmeyer

[11] Patent Number: 4,719,013

[45] Date of Patent: * Jan. 12, 1988

[54] CERAMIC FOAM FILTER

[75] Inventor: Jerry W. Brockmeyer, Hendersonville, N.C.

[73] Assignee: Swiss Aluminium Ltd., Chippis, Switzerland

[*] Notice: The portion of the term of this patent subsequent to Sep. 9, 2003 has been disclaimed.

[21] Appl. No.: 862,268

[22] Filed: May 12, 1986

Related U.S. Application Data

[63] Continuation of Ser. No. 654,391, Sep. 26, 1984, Pat. No. 4,610,832.

[51] Int. Cl.$^4$ .............................................. C04B 35/10

[52] U.S. Cl. ................................................... 210/510.1

[58] Field of Search ..................................... 210/510.1

[56] References Cited

U.S. PATENT DOCUMENTS 3,962,081  6/1976  Yarwood et al. ................ 210/510.1

Primary Examiner—Ivars Cintins
Attorney, Agent, or Firm—Bachman & LaPointe

[57] ABSTRACT

A ceramic foam material and process for making same having superior strength and durability properties wherein the impregnated foam impregnated with an alumina hydrate binder is fired at an elevated temperature so as to produce a ceramic body characterized by a solid state, sintered ceramic bond.

3 Claims, No Drawings

CERAMIC FOAM FILTER

This is a continuation of application Ser. No. 654,391, filed Sept. 26, 1984, now U.S. Pat. No. 4,610,832.

BACKGROUND OF THE INVENTION

The present invention is drawn to an improved ceramic foam material and process for making same and, more particularly, a ceramic foam material having superior mechanical, thermal and chemical properities than ceramic foam materials heretofore known.

It is known in the art to employ porous ceramic foam materials to filter molten metal, especially aluminum, as described for example in U.S. Pat. Nos. 3,893,917, 3,947,363, 3,962,081, 4,024,056, 4,024,212, 4,075,303, 4,265,659, 4,342,644 and 4,343,704. The production material for these filters comprises primarily a phosphate bonded refractory material, having certain other additions, which has been fired to a temperature of about 2000° F. in order to mature the bond. See the process described in U.S. Pat. No. 3,962,081. While this type of refractory is suitable for use in the aluminum industry and easily withstands most aluminum alloys which are typically cast at about 1300° F., it is unsuitable for many other potential applications due to its low strength and poor chemical durability. Naturally, it would be highly desirable to develop a material which maintains the favorable properties of the ceramic foam materials heretofore known, namely, high porosity, low pressure drop, high geometric surface area and tortuous flow path, but which overcomes the above-noted difficulties of strength and chemical durability. In addition, it would be desirable to develope a single material which could be relatively simply produced and used in a number of applications, especially for use in high temperature applications, such as with ferrous metals and especially in filtration applications.

Accordingly, it is a principal object of the present invention to provide an improved ceramic foam material and process for making same.

It is an additional object of the present invention to provide an improved ceramic foam material characterized by superior strength and chemical properties as well as improved mechanical and refractory properties.

It is a further object of the present invention to provide an improved ceramic foam material which is relatively simple to produce.

It is a still further object of the present invention to provide a ceramic foam material suitable for numerous diverse applications, such as for ferrous filtration.

Further objects and advantages will appear hereinbelow.

SUMMARY OF THE INVENTION

In accordance with the present invention the foregoing objects and advantages are readily obtained.

The present invention provides an improved ceramic foam material and process for making same which is characterized by superior mechanical, thermal and chemical properties.

The improved ceramic foam filter of the present invention is prepared from a ceramic slurry containing a gelled alumina hydrate binder and is for use in filtering molten metal especially in high temperature applications such as with ferrous metals. The filter is characterized by having an open cell structure with a plurality of interconnected voids surrounded by a web of said ceramic. The filter is further characterized by being substantially binder free, i.e., being substantially free of glassy phases which detract from the strength of the product. The structure is characterized by having a solid state, sintered ceramic bond.

In accordance with the process of the present invention a hydrophobic, reticulated organic polymer foam, preferably polyurethane foam, is impregnated with an aqueous slurry of a thixotropic ceramic composition including a gelled alumina hydrate binder in an amount from 3–15% by weight based on dry materials, dried and heated to remove the organic component therefrom, and fired at an elevated temperature to produce a solid state, sintered ceramic bond. Preferably boehmite, $Al_2O_3 \cdot H_2O$, is the alumina hydrate. A colloidal dispersion of the hydrate is made with an acid that will volatilize under firing temperature, such as nitric acid, and a thixotropic slurry is made with the desired ceramic material. In the preferred embodiment the firing is at a temperature of about greater than or equal to 2000° F. for from 15 minutes to 10 hours, and preferably about greater than or equal to 2500° F., so as to completely volatilize any organic materials and then sinter the refractory material. The resultant ceramic foam material is substantially free of phosphate or other organic materials which are susceptible to chemical attack. In addition, the resultant material is characterized by an increase in strength properties and chemical durability. The preferred refractory material is alumina; however, other refractory materials such as zirconia, chromia, cordierite, mullite, etc., can readily be used. Naturally, specific temperatures will vary from system to system.

DETAILED DESCRIPTION

In accordance with the present invention the ceramic foam is prepared from an open cell, preferably hydrophobic flexible foam material having a plurality of interconnected voids surrounded by a web of said flexible foam material. Typical material which may be used include the polymeric foams such as polyurethane foams, and the celluslosic foams. Generally, any combustible organic plastic foam may be used which has resilience and ability to recover its original shape. The foam must burn out or volatilize at below the firing temperature of the ceramic material which is employed.

The aqueous ceramic slurry which is employed should be thixotropic, have a relatively high degree of fluidity and be comprised of an aqueous suspension of the ceramic intended for use in the material. Typical ceramic materials which may be employed include preferably alumina and also others such as zirconia, cordierite, mullite, etc.

It is an advantage of the present invention that the use of a phosphate or other detrimental inorganic binder is unnecessary. This results in excellent high temperature properties because additives tend to reduce the high temperature properties. On the other hand, the process of the present invention produces a solid state, sintered product.

In accordance with the present invention alumina hydrate, preferably boehmite, but also mono- and trihydrates, is used as a temporary binder and rheological agent. First a colloidal dispersion is made with an acid that substantially volatilizes under firing temperature, preferably nitric acid but also hydrochloric, sulfuric or others. As indicated above this is a considerable advantage as no residual materials are left such as phosphate that are potentially reactive with molten metals. This is followed by the preparation of a thixotropic slurry with the desired ceramic material, preferably alumina.

Generally, one uses from 3-15% alumina hydrate by weight based on dry materials, and a hydrate:acid ratio of from 2:1 to 5:1, preferably about 3:1, all based on 70% acid. In the subsequent preparation of the thixotropic slurry one can use small amounts of organic additives if desired, for example, rheological agents, supplemental binders, dispersants and the like. The water content is not especially critical, for example 10-50% water based on total weight can readily be used. The water component simply obtains reasonable fluidity to impregnate the foam and coat the fibers.

Thus, in accordance with the processing of the present invention one first gels the hydrate with the acid and adds the ceramic components and water to form the slurry. If desired, one could admix all components together. The slurry is then used to prepare the ceramic foam filter.

Detailed procedures for preparing ceramic foams for molten metal filters are described in U.S. Pat. Nos. 3,962,081, 4,075,303 and 4,024,212, the disclosures of which are hereby incorporated by reference.

The flexible foam material is impregnated with the aqueous ceramic slurry so that the fiber-like webs are coated therewith and the voids are filled therewith. Normally, it is preferred to simply immerse the foam in the slurry for a short period of time sufficient to insure complete impregnation of the foam.

The impregnated foam is then compressed to expel a portion of the slurry while leaving the fiber-like web portion coated therewith and with a plurality of blocked pores throughout the body to increase flow path tortuosity, i.e., homogeneously distributed throughout the ceramic body rather than grouped together. In a continuous operation one may pass the impregnated foam through a preset roller to effect the desired expulsion of slurry from the foam and leave the desired amount impregnated therein. Naturally, this may be done manually by simply squeezing the flexible foam material to the desired extent. At this stage, the foam is still flexible and may if desired be formed into configurations suitable for specific filtration tasks, i.e., into curved plates, hollow cylinders, etc. It is necessary to hold the formed foam in position by conventional means until the organic substrate is decomposed, or preferably until the ceramic is sintered. The impregnated foam is then dried by any suitable means, such as air drying, accelerated drying at a temperature of from 100° to 700° C. for from 15 minutes to 6 hours, or by microwave drying. Air drying may be achieved in from 8 to 24 hours. After drying, the material is heated at an elevated temperature to sinter the ceramic coating on the fiber-like webs leaving the plurality of blocked pores as described above.

In accordance with the present invention, the drying procedure first yields crystallites of alumina, initially gamma-alumina eventually transformed to alpha-alumina. This provides sufficient green strength for handling and firing.

The actual firing conditions depend on the ceramic. Generally, temperatures in excess of 2000° F. and preferably in excess of 2500° F. for at least 15 minutes and generally at least 1 hour at temperature and generally less than 10 hours in order to volatilize the web of flexible foam and sinter the ceramic to form the solid state sintered ceramic bond.

The resultant product is a porous, fused ceramic foam material which is substantially free of organic components, and is characterized by superior mechanical, thermal and chemical properties to ceramic foam materials heretofore known. The ceramic foam is characterized by having an open cell structure with a plurality of interconnected voids surrounded by a web of ceramic with the substantial absence of potentially harmful binders or glassy or clay phases. The foam is a solid state, sintered product especially useful for high temperature applications such as ferrous or steel filtration. The aforesaid structure results in increasing desirable physical properties, such as increased mechanical, thermal and chemical properties. Any small amounts of organic additives would be driven off in the firing process. The small amounts of inorganic additives that may be used if desired would not detract from properties, for example, less than 1% by weight sintering aids, such as zinc oxide, grain growth inhibitors, such as magnesium oxide, or inorganic rheological aids, such as clays.

In accordance with the present invention, the specific features thereof will be more readily understandable from a consideration of the following data.

EXAMPLE 1

A thixotropic ceramic slurry was prepared by first preparing a gel consisting of the following:
1853 grams of boehmite
476 milliliters of concentrated nitric acid
9060 milliliters of water.
This gel, within the ranges discribed herein, was added to a dry power blend of:
74 kilograms of alumina
79 grams of magnesia.
An additional 300 milliliters of water was added to this mixture an the entire batch was thoroughly mixed in a high speed intensive mixer.

The aforesaid thixotropic ceramic slurry was used to impregnate nominal 20 pore per inch, open cell, flexible polyurethane foam blocks to a green density of about 10% of theoretical so that the fiber-like webs of the foam were coated therewith and the voids filled therewith. Impregnation was accomplished by immersing the foam in the slurry and using pre-set rolls to compress the foam and expel a portion of the slurry while leaving the fiber-like web portion coated therewith and with a plurality of blocked pores throughout the body to increase flow path tortuosity.

The resultant impregnated foams were dried and heated to remove the organic component there from and fired to produce a solid state, sintered ceramic bond by heating to approximately 3000° F. for one (1) hour. The resultant product is a porous, fused ceramic foam material substantially free of organic components and characterized by excellent mechanical, thermal and chemical properties. The linear firing shrinkage was about 15% such that the resulting fired ceramic foam had a fired nominal pore size of 23 pores per inch and a fired density of about 15% of theoretical.

EXAMPLE II

Ceramic foams prepared in accordance with Example I and having fired dimensions of 2"×2"×1" were used in an investment casting operation to filter high quality stainless steel castings. The ceramic filters were placed directly in the mold cavity and were under poured. The resulting castings were substantially free of inclusion related defects.

EXAMPLE III

Ceramic foams prepared in accordance with Example I and having fired dimensions of 4"×4"×1" were used to filter stainless steel fan housings. In this case a top pour arrangement was employed. High quality castings were obtained. Weld repair, normally required for such castings and which is generally due to inclusions, was substantially eliminated.

EXAMPLE IV

Ceramic foams prepared in accordance with Example I and having fired dimensios of 4"×4"×1" were used to filter a high temperature nickel-aluminum-bronze alloy test casting. A high quality casting was obtained. This casting would normally require many hours of weld repair; however, the resultant casting of this example reduced the weld work substantially.

EXAMPLE V

A thixotropic slurry was prepared as in Example I and was used to impregnate a nominal 10 pore per inch, open cell, flexible polyurethane foam block as in Example I. The resultant impregnated foam was microwave dried and then fired to 3000° F. to produce a solid state, sintered ceramic bond and a porous, fused ceramic foam material substantially free of organic components characterized by excellent mechanical, thermal and chemical properties. The fired ceramic foam, measuring 4"×4"×1" with a fired pore size of about 12 pores per inch, was used to filter a low alloy steel casting. Inclusion related defects were substantially eliminated.

Thus, as can be seen from the foregoing, a ceramic foam material having superior strength properties and chemical durability is obtained.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A ceramic foam filter for use in filtering molten metal prepared from a reticulated, organic polymer foam impregnated with an aqueous slurry of a thixotropic ceramic composition including a gelled alumina hydrate binder which comprises a substantially phosphate-free, open cell structure with a plurality of interconnected voids surrounded by a web of said ceramic wherein said structure is characterized by having a solid state, sintered ceramic bond substantially binder free and substantially free of glassy phases.

2. A filter according to claim 1 wherein said ceramic is alumina.

3. A filter according to claim 1 comprising a porous, fused ceramic foam material which is substantially free of organic components.

* * * * *